(12) United States Patent
Henion

(10) Patent No.: US 7,540,619 B2
(45) Date of Patent: Jun. 2, 2009

(54) SINGLE ARM TOW MIRROR ASSEMBLY

(75) Inventor: Paul R. Henion, Port Huron, MI (US)

(73) Assignee: Visiocorp Patents S.a.r.l., Luxembourg (LU)

( * ) Notice: Subject to any disclaimer, the term of this patent is extended or adjusted under 35 U.S.C. 154(b) by 190 days.

(21) Appl. No.: 11/668,642

(22) Filed: Jan. 30, 2007

(65) Prior Publication Data

US 2008/0180822 A1     Jul. 31, 2008

(51) Int. Cl.
*G02B 5/08*     (2006.01)

(52) U.S. Cl. ...................................... 359/876

(58) Field of Classification Search ............... 248/479, 248/481, 482, 485; 359/872, 875, 876, 879, 359/880

See application file for complete search history.

(56) References Cited

U.S. PATENT DOCUMENTS 5,864,438 A     1/1999     Pace
6,394,616 B1 *     5/2002     Foote et al. .................. 359/877
6,877,868 B2     4/2005     Olijnyk et al.

* cited by examiner

*Primary Examiner*—Euncha P Cherry
(74) *Attorney, Agent, or Firm*—Reising Ethington P.C.

(57) ABSTRACT

An external rearview mirror assembly is fixedly secured to a motor vehicle. The external rearview mirror assembly includes a mounting bracket which is fixedly secured to the motor vehicle. An arm is pivotally secured to the mounting bracket. The arm defines an elongated channel having an upper arm surface, a lower arm surface, and an intermediate arm surface disposed between the upper and lower arm surfaces. A case frame extends between a bracket and a distal end. The case frame defines an elongated channel for receiving the elongated channel therein. A mirror is movably secured to the distal end of the case frame to provide a view rearward of the motor vehicle.

18 Claims, 5 Drawing Sheets

US 7,540,619 B2

SINGLE ARM TOW MIRROR ASSEMBLY

BACKGROUND ART

1. Field of the Invention

The invention relates generally to a vehicle mirror. More particularly, the invention relates to a vehicle mirror that is movable between extended and retracted positions.

2. Description of the Related Art

Mirror assemblies that extend out the sides of motor vehicles are used to assist the operator thereof to quickly view the surroundings of the motor vehicle without diverting attention from the direction in which the motor vehicle is being driven. Mirror assemblies include features such as turn signals and heaters to further aid the operator in operating the vehicle in a safe manner.

With the advent of larger sized vehicles and an increased capacity to tow large, heavy loads, there is the need to produce mirror assemblies that have the ability to provide the operator of the motor vehicle with a view beyond the cargo being towed. This is typically accomplished by moving the mirror assembly further away from the motor vehicle. The repositioning of the mirror with respect to the motor vehicle has typically been done manually.

Remote actuation of the mirror assembly has, however, been introduced and is very popular because it eliminates the need for the operator to extend a hand outside the window to adjust the position of the mirror. Remote actuation is also popular because the operator is able to adjust the mirror from the position in which the operator will be using the mirror to view what is behind the motor vehicle. This eliminates the need to adjust the mirror position, sit back in a normal vehicle operation position, and then sit up and readjust the mirror again, with repeating this process until the operator is satisfied with the position of the mirror.

U.S. Pat. No. 5,864,438, issued to Pace on Jan. 26, 1999 discloses a vehicle mirror assembly that is movable between a retracted position and an extended position. This patent discloses the mirror assembly having a rack and pinion assembly wherein the pinion gear is rotated forcing the mirror assembly to move along the rack between its extended and retracted positions. This mirror assembly is not a telescoping mirror assembly because it includes a corrugated, flexible boot that is stretched and/or compressed based on the position of the mirror with respect to the motor vehicle. In addition, the mirror position is maintained by the relationship between the rack and pinion. Therefore, unnecessary forces are being applied to the mechanism that moves the mirror assembly, which will eventually accelerate its wear and tear.

SUMMARY OF THE INVENTION

An external rearview mirror assembly is fixedly secured to a motor vehicle. The external rearview mirror assembly includes a mounting bracket which is fixedly secured to the motor vehicle. An arm is pivotally secured to the mounting bracket. The arm defines an elongated channel having an upper arm surface, a lower arm surface, and an intermediate arm surface disposed between the upper and lower arm surfaces. A case frame extends between a bracket and a distal end. The case frame defines an elongated channel for receiving the elongated channel therein. A mirror is moveably secured to the distal end of the case frame to provide a view rearward of the motor vehicle.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
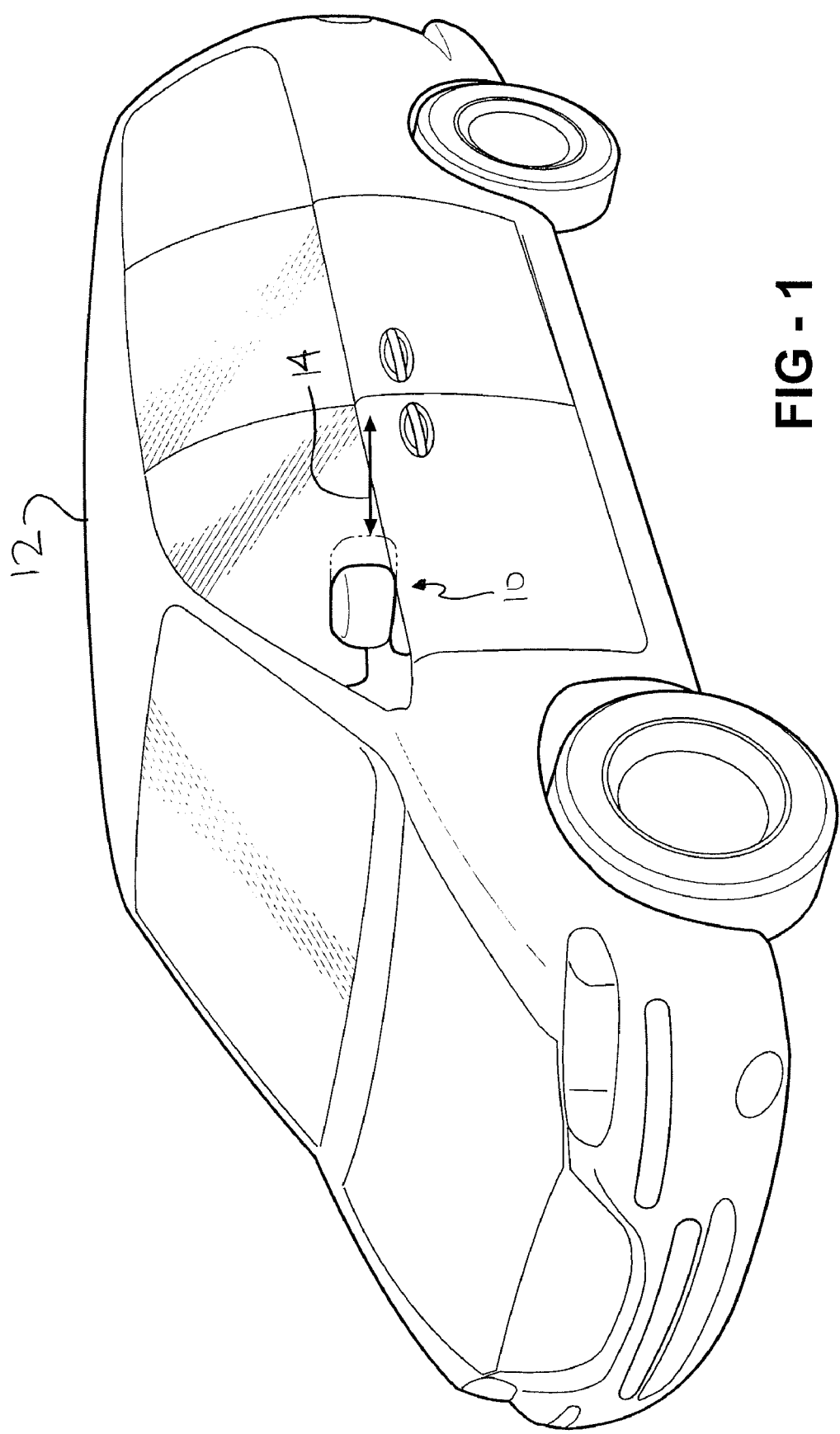
FIG. 1 is a perspective view of a motor vehicle having a telescoping mirror assembly according to the invention.
Figure 2:
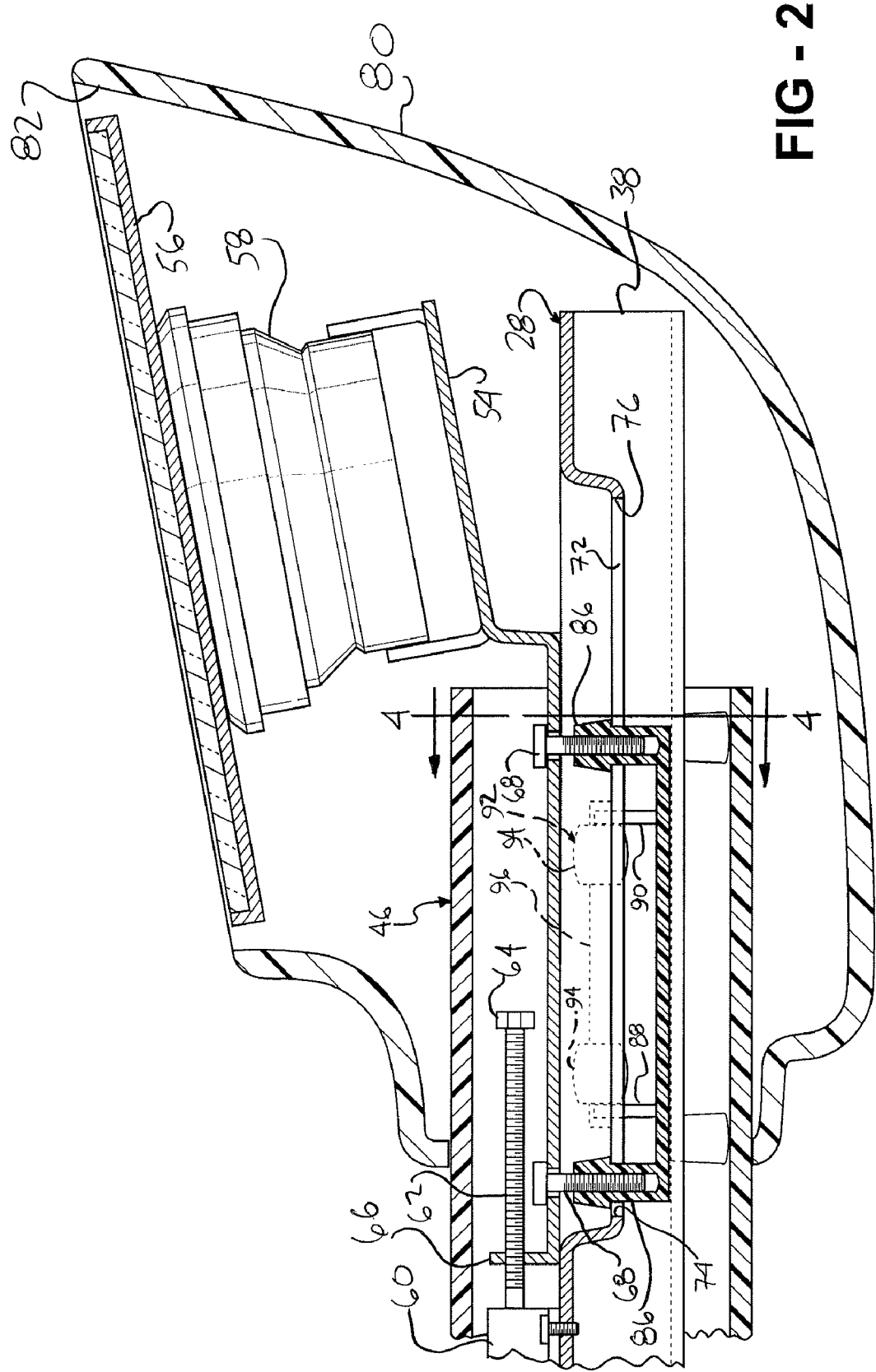
FIG. 2 is a cross-sectional top view, partially cut away, of a portion of the rearview mirror assembly in its retracted position.
Figure 3:
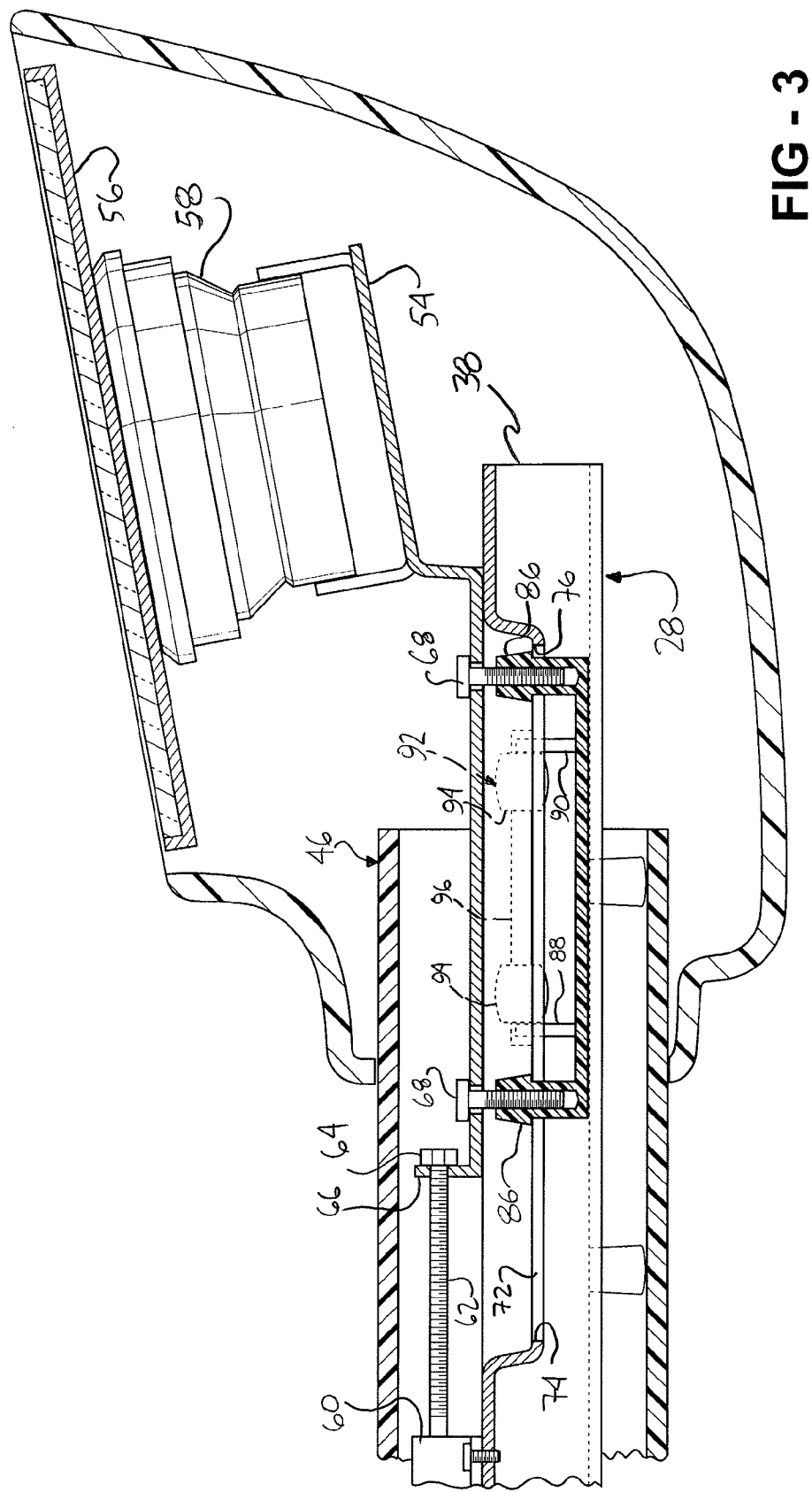
FIG. 3 is a cross-sectional top view, partially cut away, of the mirror assembly in its extended position.

An external rearview mirror assembly according to the invention is generally indicated at 10 in FIG. 1. The external rearview mirror assembly 10 is a side mirror that allows an occupant of a motor vehicle 12 to see rearward of the motor vehicle 12 without having to turn the operator's head completely around. This provides an opportunity for the operator of the motor vehicle 12 to view areas rearward of the motor vehicle 12 without totally losing sight of the space directly in front of the motor vehicle 12. While it is contemplated that the external rearview mirror assembly 10 may be mounted on both sides of the motor vehicle, only one is shown in FIG. 1. Similar features will be, however, incorporated into external rearview mirror assemblies 10 that are fixedly secured to the passenger side of the motor vehicle 12.

A bidirectional arrow 14 illustrates the ability of the external rearview mirror assembly 10 to move from a retracted use position to an extended use position wherein the extended use position is the position where the external rearview mirror assembly 10 is furthest away from the side of the motor vehicle 12. This position is ideal for use when the motor vehicle 12 is towing a trailer or other such cargo (not shown).

Figure 5:
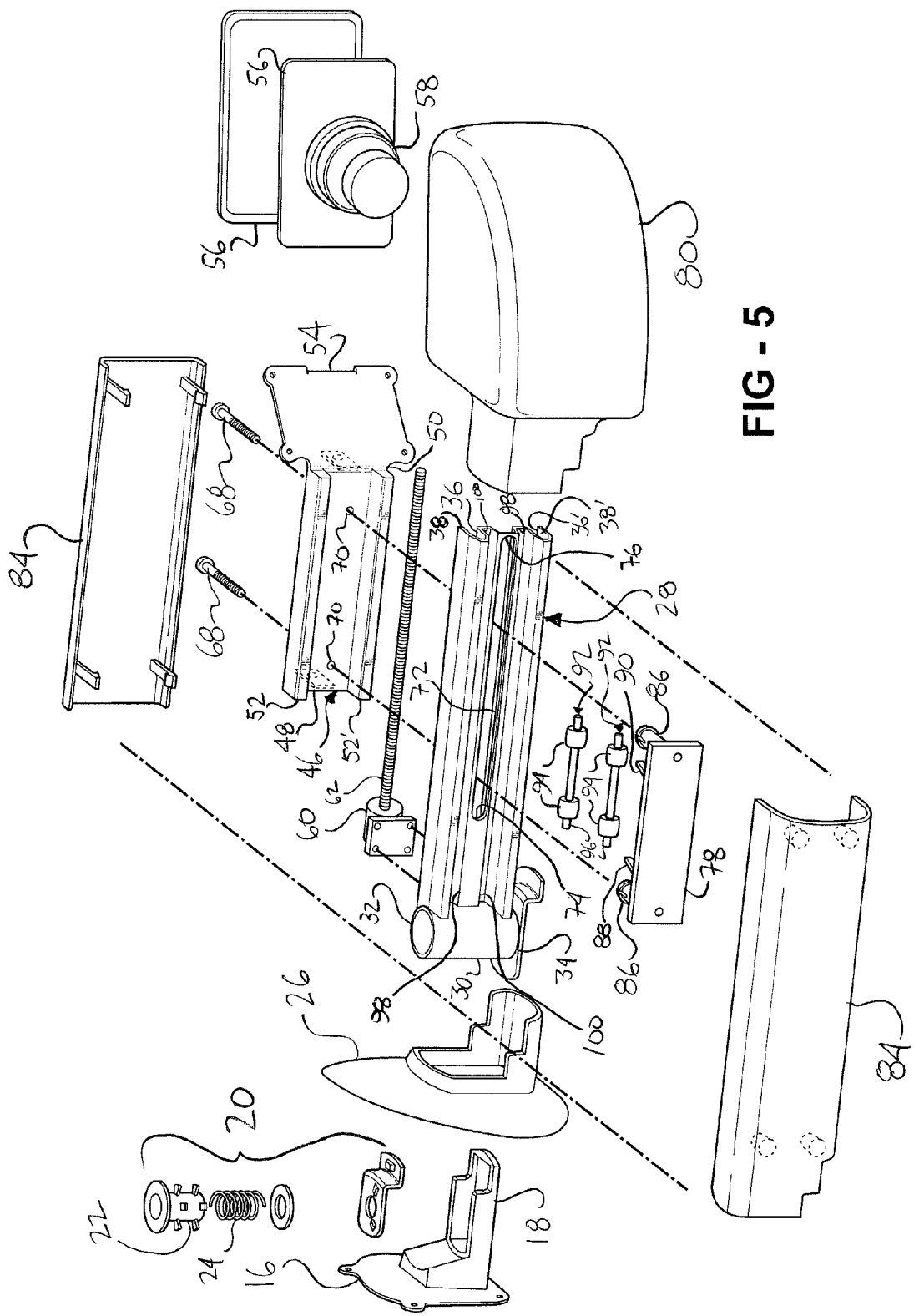
FIG. 5 is an exploded perspective view of one embodiment of the invention.

Referring to FIG. 5, the external rearview mirror assembly 10 includes a mounting bracket 16 which fixedly secures the external rearview mirror assembly 10 to the motor vehicle 12. The mounting bracket 16 is L-shaped and includes a receiving leg 18 that receives a pivoting mechanism 20. The pivoting mechanism 20 allows the external rearview mirror assembly 10 to pivot about a pivot cylinder 22 with respect to the motor vehicle 12. A spring 24 is designed to prevent the external review mirror assembly 10 from moving in a pivoting motion with respect to the motor vehicle 12 when it is not desired for such movement to occur. A bracket facia 26 extends over the mounting bracket 16 to provide an aesthetically pleasing transition between the motor vehicle 12 and the external rearview mirror assembly 10 without having to view the mounting bracket 16.

The external rearview mirror assembly 10 includes an arm, generally shown at 28. The arm 28 is pivotally secured to the mounting bracket 16 at a bracket end 30. The bracket end 30 includes a hollow cylinder 32 that receives the pivot cylinder 22 therein. A bracket plate 34 is fixedly secured to the hollow cylinder 32 at the bottom thereof to matingly engage the receiving leg 18 of the mounting bracket 16.

Figure 4:
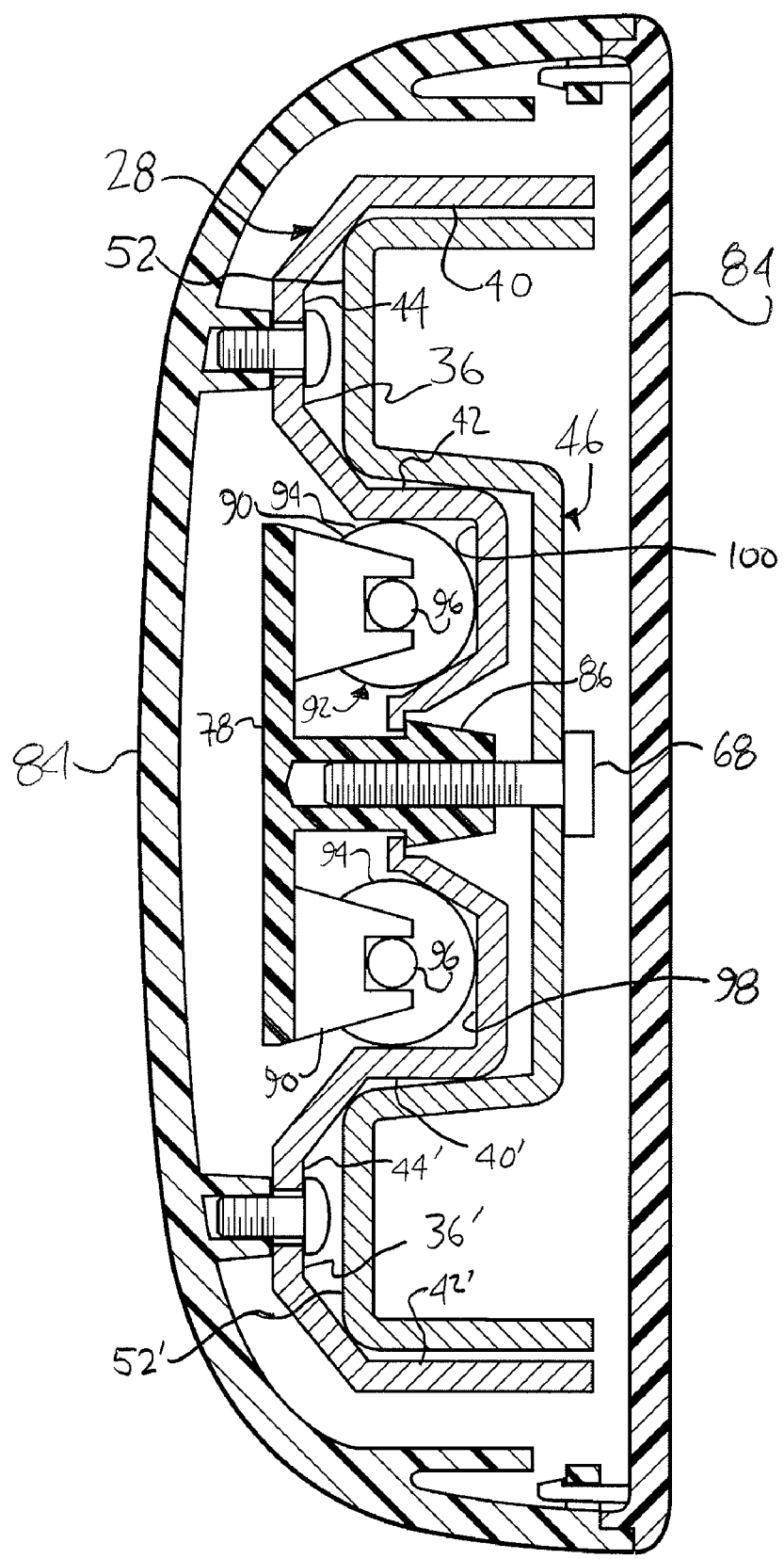
FIG. 4 is a cross-sectional side view taken along lines 4-4 of FIG. 2.

The arm 28 is the sole arm of the external rearview mirror assembly 10. The arm 28 defines an elongated channel 36 that extends from the bracket end 30 out to a distal end 38 of the arm 28. As may be best seen in FIG. 4, the elongated channel has an upper arm surface 40, a lower arm surface 42 and an intermediate arm surface 44. While the elongated channel 36 is shown to be concave when looking at it in the same direction as forward motion of the motor vehicle is should be appreciated that the orientation of the elongated channel 36 may be 180° out of phase with that which is shown resulting in a convex structure when viewed in the same direction as forward movement of the motor vehicle.

The external rearview mirror assembly 10 also includes a case frame, generally shown at 46. The case frame 46 extends between an interior end 48 and a mirror end 50. The case frame 46 defines an elongated ridge 52 that is received by the elongated channel 36.

The case frame 46 also includes a mounting plate 54 which extends out from the case frame 46 at an angle thereto. The mounting plate 54 is designed to have a mirror 56 mounted thereto. The mirror 56 is mounted to the mounting plate 54 at the mirror end 50 of the case frame 46 in a movable fashion allowing the mirror 56 to move with respect to the controls of the operator to allow the operator to maximize the view of the space immediately adjacent and rearward of the motor vehicle 12. The mirror 56 is adjustable using a positioning device 58 disposed between the mirror 56 and the mounting plate 54, as is known in the art.

The external rearview mirror assembly 10 includes a mirror housing 80 which houses the mounting plate 54 of the case frame 46 as well as the positioning device 58 and the mirror 56 therein. The mirror housing 80 includes an opening 82 to allow an operator to view the mirror 56.

While the arm 28 and case frame 46 were discussed as having a single elongated channel 36 and elongated ridge 52, respectively, it should be appreciated that there may be any number of elongated channels and ridges designed with these parts. In the drawings, wherein like prime numerals represent similar structure, the arm 28 and the case frame 46 include a pair of elongated channels 36, 36' and a pair of elongated ridges 52, 52', respectively. The construction of the elongated channel 36' and the elongated ridge 52' are identical to that of the elongated channel 36 and ridge 52 discussed above. While it is contemplated that there are a number of channel and ridges in the design of the external rearview mirror assembly 10, the remainder of the discussion will only describe the interaction between a single elongated channel 36 and a single elongated ridge 52 for purposes of simplifying this disclosure.

The case frame 46 slides longitudinally relative to the arm 28. This allows the external rearview mirror assembly 10 to move between its retracted and extended positions. A motor 60 and worm gear 62 cooperate with a nut 64 and flange 66 on the case frame 46 to position the case frame 46 relative to the arm 28. There are several configurations of the motor 60 which would allow the relative motion between the arm 28 and the case frame 46. Therefore, the motor 60/worm gear 62 combination is shown merely as an example of how an operator could control the position of the case frame 46 with respect to the arm 28. The case frame 46 slides relative to the arm 28 because two bolts 68 extend through two holes 70 in the case frame. These bolts extend through a slot 72 which extends through the center of the arm 28. The slot 72 includes two ends 74, 76, which act as stops for the movement of the case frame 46. The bolts 68 are received into a friction barrel retainer 78, to be discussed in greater detail subsequently.

The external rearview mirror assembly 10 also includes an arm cover 84 that provides a protective cover to the arm 28. In the embodiment shown, the arm cover 84 includes two halves which come together on the outside of the arm 28 and the case frame 46.

The friction fastener 78 includes two threaded bosses 86. The threaded bosses 86 receive the bolts 68 therein to secure the bolts 68 preventing the case frame 46 from moving away from the arm 28. More specifically, the combination of the bolts 68 and the threaded bosses 86 prevent any movement of the case frame 46 relative to the arm 28 other than the sliding movement thereof. The friction barrel retainer 78 also includes two posts 88, 90. The friction barrel retainer 78 integrally contains posts 88, 90 that fixedly hold the spring wires 96. The spring wires 96 pass through a hole in each fiction barrel 94. In this manner, the spring wires 96 are supported on each end and are allowed to flex as the friction barrels 94 are put under pressure as they bear against the arm. In the preferred embodiment, there are two friction barrels or cylinders 94 secured to each spring 96.

The cylinders 94 abut against the arm 28 in friction channels 98, 100. The cylinders 94 and the channels 98, 100 are designed such that the cylinders 94 abut the friction channels 98, 100 on multiple sides maximizing the ability to maintain the case frame 46 in a position with respect to the arm 28 as directed by the operator of the motor vehicle 12.

When the mirror is assembled, as the bolts 68 pass through the case frame 46, the slot 72 of the arm 28 is secured into the friction barrel retainer 78, pressure is applied between the friction barrels 94 and the channels 98, 100 on one side of the arm 28 as well as between the elongated channels 36, 36' of the arm 28 and the elongated ridges 52, 52' of the case frame 46 on the other side of the arm 28. Thus, pressure is being applied from the case fram/friction barrel 46/94 embodiment to both sides of the arm 28 holding the mirror head in position longitudinally until manual or electric forces are applied to the system to move the mirror housing 80 either inboard or outboard.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. An external rearview mirror assembly for a motor vehicle, said external rearview mirror assembly comprising:
a mounting bracket fixedly secured to the motor vehicle;
an arm pivotally secured to said mounting brackets, said arm defining an elongated channel having an upper arm surface, a lower arm surface and an intermediate arm surface disposed between said upper and lower arm surfaces, said arm including a second elongated ridge having a second upper arm surface, a second lower arm and a second intermediate arm surface disposed between said second upper arm surface and said second lower arm surface;
a case frame extending between an interior end and a mirror end, said case frame defining an elongated ridge to be received by said elongated channel, said case frame slides relative to said arm between a retracted position and an extended position; and
a mirror movably secured to said mirror end of said case frame to provide a view rearward of the motor vehicle.

2. An external rearview mirror assembly as set forth in claim 1 including a frictional element extending along said arm for creating a frictional force to prevent said case frame from moving with respect to said arm.

3. An external rearview mirror assembly as set forth in claim 2 including a retainer for retaining said frictional element against said arm.

4. An external rearview mirror assembly as set forth in claim 3 including a spring through which said retainer is mounted.

5. An external rearview mirror assembly as set forth in claim 4 wherein said frictional element is cylindrical in shape.

6. An external rearview mirror assembly as set forth in claim 5 including a drive train to create a drive force greater than said functional force to move said case frame between said retracted and extended positions.

7. An external rearview mirror assembly as set forth in claim 6 wherein said arm includes a slot.

8. An external rearview mirror assembly as set forth in claim 7 including inboard and outboard bolts extending through said case frame and said slot in said arm, and received by said retainer to hold said retainer and said case frame in alignment with said arm.

9. An external rearview mirror assembly as set forth in claim 8 wherein said slot defines an inboard stop and an outboard stop to prevent said inboard and outboard bolts from moving therepast.

10. An external rearview mirror assembly as set forth in claim 8 wherein said slot extends between said elongated ridge and said second elongated ridge.

11. An external rearview mirror assembly for a motor vehicle, said external rearview mirror assembly comprising:
   a mounting bracket fixedly secured to the motor vehicle;
   an arm pivotally secured to said mounting brackets said arm defining an elongated channel having an upper arm surface, a lower arm surface and an intermediate arm surface disposed between said upper and lower arm surfaces, said arm including a second elongated ridge having a second upper arm surface, a second lower arm and a second intermediate arm surface disposed between said second upper arm surface and said second lower arm surface;
   a case frame extending between an interior end and a mirror end, said case frame defining an elongated ridge to be received by said elongated channel;
   a frictional element cylindrical in shape extending along said arm for creating a frictional force to prevent said case frame from moving with respect to said arm; and
   a mirror movably secured to said mirror end of said case frame to provide a view rearward of the motor vehicle.

12. An external rearview mirror assembly as set forth in claim 11 wherein said case frame slides relative to said arm between a retracted position and an extended position.

13. An external rearview mirror assembly as set forth in claim 12 including a retainer for retaining said frictional element against said arm.

14. An external rearview mirror assembly as set forth in claim 13 including a drive train to create a drive force greater than said frictional force to move said case frame between said retracted and extended positions.

15. An external rearview mirror assembly as set forth in claim 14 wherein said arm includes a slot.

16. An external rearview mirror assembly as set forth in claim 15 including inboard and outboard bolts extending through said case frame and said slot in said arm, and received by said retainer to hold said retainer and said case frame in alignment with said arm.

17. An external rearview mirror assembly as set forth in claim 16 wherein said slot defines an inboard stop and an outboard stop to prevent said inboard and outboard bolts from moving therepast.

18. An external rearview mirror assembly as set forth in claim 17 wherein said slot extends between said elongated ridge and said second elongated ridge.

* * * * *